(12) United States Patent
Trumper et al.

(10) Patent No.: US 9,140,155 B2
(45) Date of Patent: Sep. 22, 2015

(54) MODULAR EXHAUST SYSTEM

(71) Applicant: Caterpillar Inc., Peoria, IL (US)

(72) Inventors: Mary Jill Trumper, Sullivan, IL (US); Christopher A. Willey, Decatur, IL (US); Kris E. Seitz, Bethany, IL (US); Andrew D. Hill, Jonesboro, AR (US); Thomas N. Brooks, Jr., Oakley, IL (US); Troy A. Shawgo, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 13/908,195

(22) Filed: Jun. 3, 2013

(65) Prior Publication Data

US 2014/0353064 A1    Dec. 4, 2014

(51) Int. Cl.
*B60K 13/04*     (2006.01)
*F01N 3/021*     (2006.01)
*F01N 3/28*     (2006.01)
*F01N 3/022*     (2006.01)
*F01N 13/00*     (2010.01)

(52) U.S. Cl.
CPC ............ *F01N 3/0217* (2013.01); *F01N 3/0211* (2013.01); *F01N 3/0222* (2013.01); *F01N 3/28* (2013.01); *F01N 3/2878* (2013.01); *F01N 13/0093* (2014.06); *F01N 13/0097* (2014.06); *F01N 13/017* (2014.06); *F01N 2330/06* (2013.01); *F01N 2470/24* (2013.01); *F01N 2590/08* (2013.01)

(58) Field of Classification Search
CPC ................................ F01N 3/0217; F01N 3/031
USPC ...................................... 180/309; 60/274, 311
See application file for complete search history.

(56) References Cited

U.S. PATENT DOCUMENTS

| | | | | |
|---|---|---|---|---|
| 4,625,511 A * | 12/1986 | Scheitlin et al. | ................. | 60/299 |
| 5,089,236 A * | 2/1992 | Clerc | .............................. | 422/177 |
| 5,125,231 A * | 6/1992 | Patil et al. | ......................... | 60/274 |
| 5,140,811 A * | 8/1992 | Minami et al. | ................... | 60/297 |
| 5,144,796 A * | 9/1992 | Swars | .............................. | 60/288 |
| 5,171,341 A * | 12/1992 | Merry | .............................. | 55/484 |
| 5,238,472 A * | 8/1993 | Pfister et al. | .................. | 55/282.3 |
| 5,315,824 A * | 5/1994 | Takeshima | ....................... | 60/297 |
| 5,458,664 A * | 10/1995 | Ishii et al. | ........................ | 55/282 |
| 5,934,069 A * | 8/1999 | Hertl et al. | ....................... | 60/274 |
| 6,013,118 A * | 1/2000 | Matsunuma et al. | ......... | 55/282.3 |
| 6,321,530 B1* | 11/2001 | Hoshi et al. | ...................... | 60/274 |
| 6,327,852 B1* | 12/2001 | Hirose | ............................ | 60/297 |
| 6,694,727 B1* | 2/2004 | Crawley et al. | .................... | 60/295 |
| 6,913,001 B2* | 7/2005 | Abdolhosseini et al. | ...... | 123/519 |
| 7,207,172 B2* | 4/2007 | Willix et al. | ...................... | 60/317 |
| 7,273,592 B2* | 9/2007 | Jacob et al. | .................... | 422/169 |
| 7,341,699 B2* | 3/2008 | Thieman et al. | ............... | 422/177 |
| 7,383,912 B2* | 6/2008 | Kondo et al. | ................... | 180/296 |
| 7,444,803 B2* | 11/2008 | Iwamoto et al. | ................ | 60/288 |
| 7,963,108 B2* | 6/2011 | Cornwell | ......................... | 60/312 |
| 7,987,935 B2* | 8/2011 | Ichimoto | .................... | 180/65.28 |
| 8,443,593 B2* | 5/2013 | Sloss et al. | ....................... | 60/320 |
| 8,783,011 B2* | 7/2014 | Korenev | .......................... | 60/274 |
| 8,863,498 B2* | 10/2014 | Yoshioka et al. | ................ | 60/276 |
| 2005/0132674 A1* | 6/2005 | Toyoda et al. | ................ | 55/282.3 |
| 2006/0213189 A1* | 9/2006 | Allansson et al. | .............. | 60/311 |

(Continued)

*Primary Examiner* — Jeffrey J Restifo
(74) *Attorney, Agent, or Firm* — Bryce Rufener

(57) ABSTRACT

A modular exhaust system is disclosed for treating the exhaust from a fossil fuel powered prime mover; the exhaust system includes bricks, inserts placed inside of the bricks and funnels to direct exhaust through various flow paths in order to treat the exhaust.

16 Claims, 7 Drawing Sheets

(56) References Cited

U.S. PATENT DOCUMENTS

2009/0038294 A1* 2/2009 Anderson et al. ............... 60/295
2011/0113755 A1* 5/2011 Kim ............................... 60/275
2012/0043153 A1* 2/2012 Wieres et al. ................. 180/309
2012/0144809 A1 6/2012 Ducroquet
2012/0240560 A1* 9/2012 Oh et al. ......................... 60/287
2013/0028818 A1 1/2013 Eckhoff et al.
2014/0353064 A1* 12/2014 Trumper et al. .............. 180/309

* cited by examiner

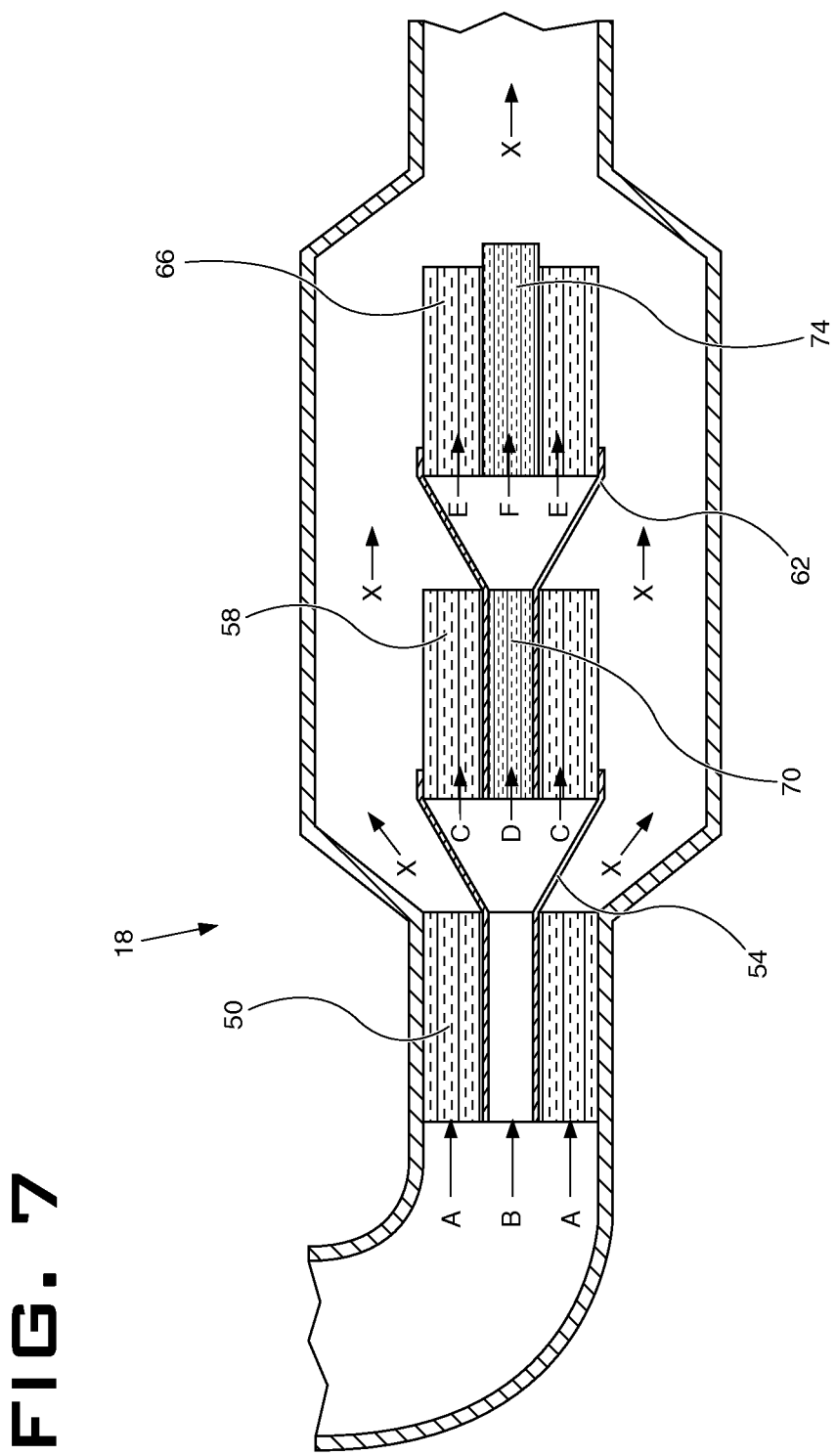

MODULAR EXHAUST SYSTEM

TECHNICAL FIELD

The present disclosure relates to modular exhaust systems for treating the exhaust of fossil fuel powered systems in order to reduce or remove undesirable emissions.

BACKGROUND

Exhaust treatment systems are used to remove undesirable emissions from the exhaust of fossil fuel powered systems (e.g. diesel engine, gas engines, gas turbines), which may be used to drive, for example, generators, commercial vehicles, machines, ships, and locomotives. Exhaust treatment systems may include a variety of emissions treatment technology, such as diesel oxidation catalysts (DOCS), diesel particulate filters (DPFs), selective catalytic reduction catalysts (SCRs), lean NOx traps (LNTs) or other devices used to treat the exhaust.

Exhaust treatment systems may be installed as original equipment or may be retrofitted to a specific application. To facilitate easier installation, some exhaust treatment systems are preassembled with components enclosed within a common housing. U.S. Patent Publication 2012/0144809 discloses a catalytic converter module which houses two catalyst units geometrically arranged in a serial manner.

SUMMARY

In one embodiment the disclosure includes a modular exhaust system having a first brick having a first opening thereon, the first brick having a first flow path through a first medium and a second flow path through the first opening and a first funnel having a narrow portion and a wide portion, the narrow portion being at least partially disposed in the first opening and the wide portion being in contact with a second brick. The exhaust system further includes the second brick having a second opening thereon, the second brick having a third flow path through a second medium and a fourth flow path through the second opening and a second funnel having a narrow portion and a wide portion, the narrow portion being at least partially disposed in the second opening and the wide portion contacting a third brick. In addition the exhaust system has the third brick having a third opening thereon, the third brick having a fifth flow path through a third medium and a sixth flow path through the third opening.

Another embodiment discloses an emissions module for a fossil-fuel powered prime mover including a housing having an entrance and an exit; a first brick coupled to the housing, the first brick having a first opening thereon, the first brick having a first flow path through a first medium and a second flow path through the first opening; and a first funnel having a narrow portion and a wide portion, the narrow portion being at least partially disposed in the first opening and the wide portion being in contact with a second brick. The emissions module also includes the second brick disposed in the housing, the second brick having a second opening thereon, the second brick having a third flow path through a second medium and a fourth flow path through the second opening; a second funnel having a narrow portion and a wide portion, the narrow portion being at least partially disposed in the second opening and the wide portion contacting a third brick; and the third brick disposed in the housing, the third brick having a third opening thereon, the third brick having a fifth flow path through a third medium and a sixth flow path through the third opening.

Yet another embodiment of the disclosure is a truck having a frame; a body coupled to the frame for carrying a payload; and a fossil-fuel powered engine coupled to the frame. The truck also includes an emissions module coupled to the engine having a housing having an entrance and an exit; a first brick coupled to the housing, the first brick having a first opening thereon, the first brick having a first flow path through a first medium and a second flow path through the first opening; and a first funnel having a narrow portion and a wide portion, the narrow portion being at least partially disposed in the first opening and the wide portion being in contact with a second brick. The emissions module also has the second brick disposed in the housing, the second brick having a second opening thereon, the second brick having a third flow path through a second medium and a fourth flow path through the second opening; a second funnel having a narrow portion and a wide portion, the narrow portion being at least partially disposed in the second opening and the wide portion contacting a third brick; and the third brick disposed in the housing, the third brick having a third opening thereon, the third brick having a fifth flow path through a third medium and a sixth flow path through the third opening. The emissions module also includes a first insert comprising a fourth medium, the first insert being disposed in the second opening; and a second insert comprising a fifth medium, the second insert being disposed in the third opening.

BRIEF DESCRIPTION OF THE DRAWINGS

The disclosure will become more fully understood from the following detailed description, taken in conjunction with the accompanying figures, wherein like reference numerals refer to like elements, in which:

FIG. 7 is a sectional view of a portion of the exhaust system of FIG. 2.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
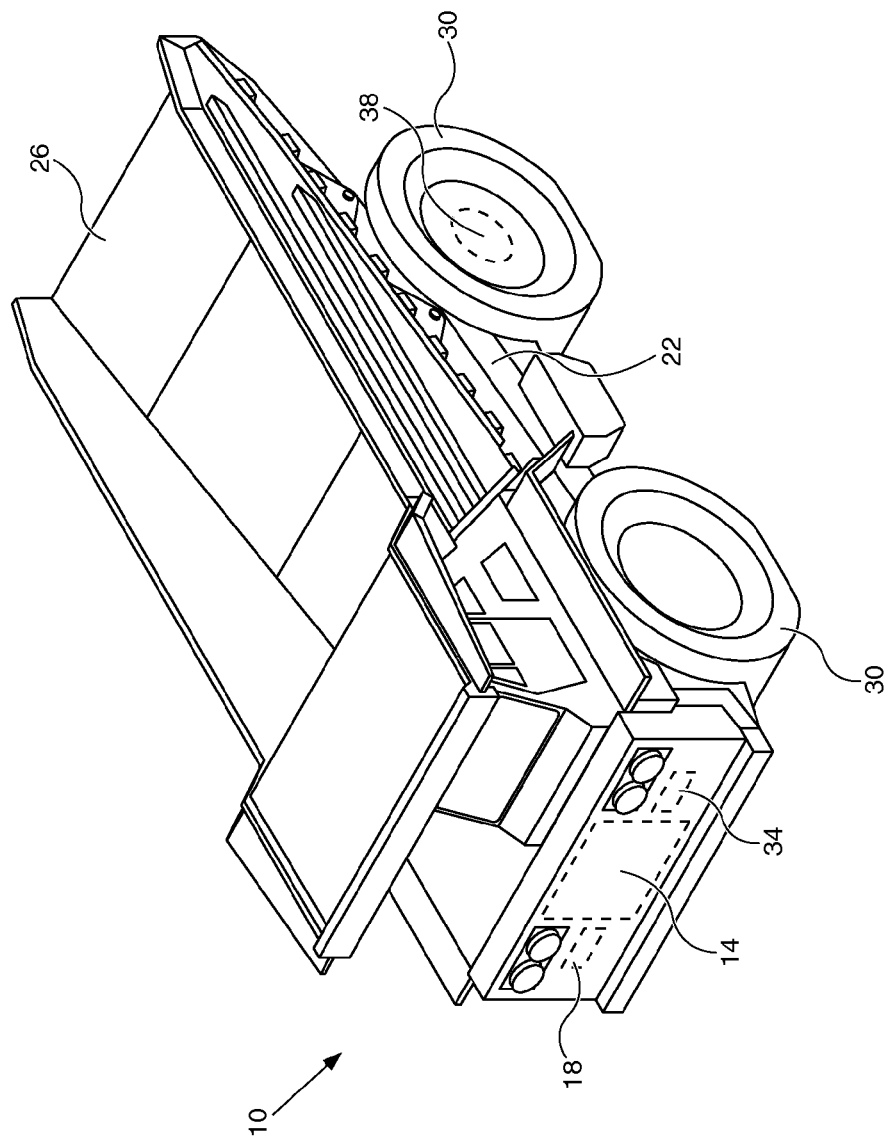
FIG. 1 is a perspective view of an off-highway truck.

Referring to FIG. 1, an off-highway truck 10 is shown. The off-highway truck 10 includes a fossil-fueled prime mover 14 and an exhaust system 18. The prime mover 14 may include features not shown, such as fuel systems, air systems, cooling systems, peripheries, drivetrain components, turbochargers, hydraulic systems, electrical systems, etc. The prime mover 14 may be any type of engine (internal combustion, turbine, gas, diesel, gaseous fuel, natural gas, propane, etc.), may be of any size, with any number of cylinders, and in any configuration ("V," in-line, radial, etc.). The prime mover 14 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The off-highway truck 10 includes a frame 22, a body 26, wheels 30, an electric generator 34 and an electric motor 38. The frame 22 provides support for the prime mover 14 and exhaust system 18. The body 26 is coupled to the frame 22 and is used for carrying a payload, such as dirt, gravel or the like. The wheels 30 are coupled to the frame 22 and allow the off-highway truck 10 to move. The electric generator 34 is powered by the prime mover 14 and is used to generate electricity. The electric motor 38 is electrically coupled to the electric generator 34 and is used to turn some or all of the wheels 30. In an alternative embodiment the off-highway truck 10 may be a mechanical drive truck where the wheels 30 are rotated using a driveshaft and a differential coupled to the prime mover 14.

Figure 2:
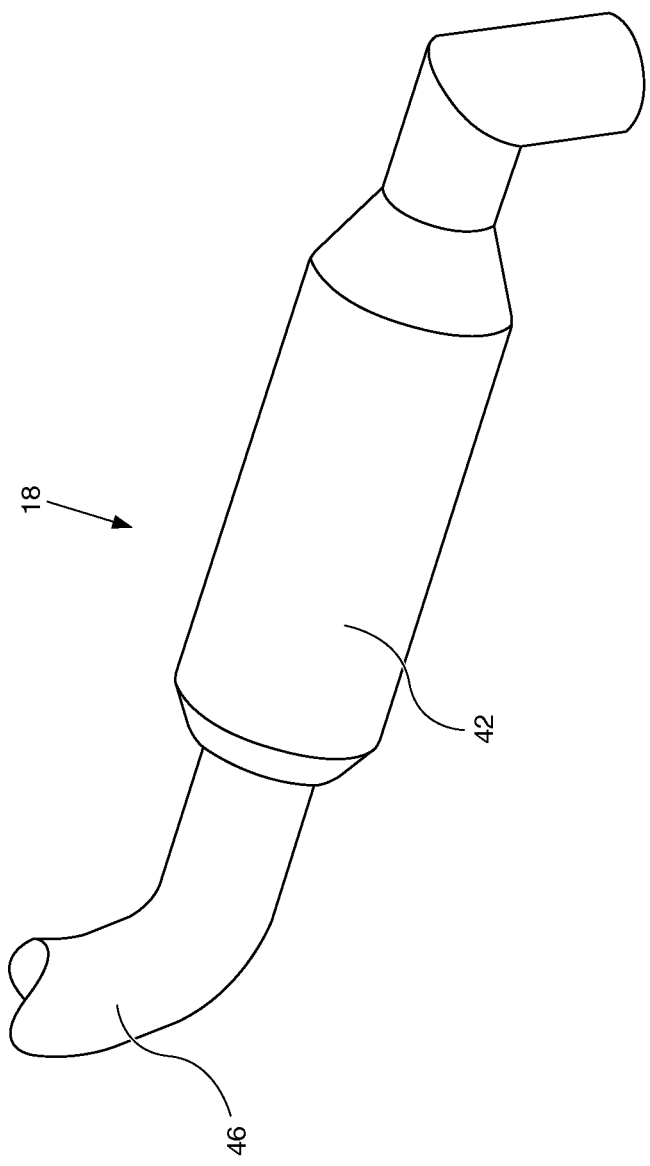
FIG. 2 is a perspective view of an exhaust system.

A portion of the exhaust system 18 is illustrated in FIG. 2. The exhaust system includes an emissions module 42 configured to treat one or more exhaust stream(s) produced by the prime mover 14. The exhaust system 18 also includes an exhaust pipe 46 for fluidly coupling the emissions module 42 to the prime mover 14. The exhaust system 18 may also include other components such as mufflers, particulate filters, catalysts and urea injection systems.

Figure 3:
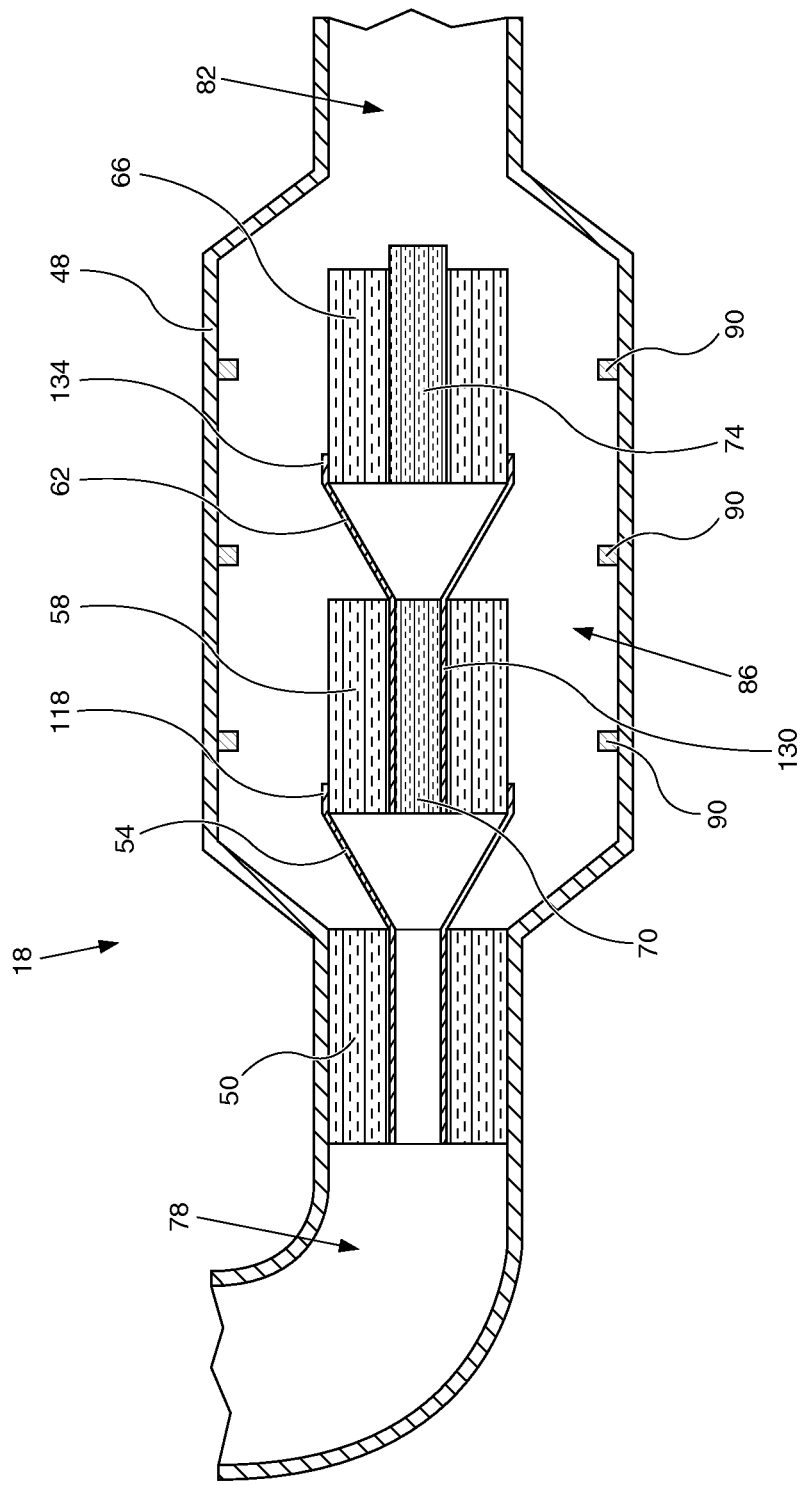
FIG. 3 is a sectional view of a portion of the exhaust system of FIG. 2.

The exhaust system 18 includes a housing 48, illustrated in FIG. 3, configured to entirely or partially enclose one or more exhaust aftertreatment devices designed to reduce undesirable emissions from the exhaust stream(s) of the prime mover 14. The exhaust aftertreatment devices may include a variety of emissions treatment technology, including, but not limited to, regeneration devices, heat sources, oxidation catalysts, diesel oxidation catalysts (DOCS), diesel particulate filters (DPFs), selective catalytic reduction catalysts (SCRs), lean NOx traps (LNTs), mufflers, or other devices needed to treat the exhaust stream exiting the prime mover 14.

Turning now to FIG. 3, a portion of the exhaust system 18 is shown in cross-section. The exhaust system includes a first brick 50, a first funnel 54, a second brick 58, a second funnel 62, and a third brick 66. The exhaust system also includes a first insert 70 and a second insert 74. Other embodiments may include greater or fewer bricks, inserts and/or funnels. The exhaust system 18 also includes the housing 48.

The housing 48 includes an entrance 78 and an exit 82. The entrance 78 has an inner diameter and the exit 82 also has an inner diameter. In the illustrated embodiment the inner diameters of the entrance 78 and exit 82 are the same, but in other embodiments they are different. The housing also includes a center 86 portion. The center portion 86 has an inner diameter. The inner diameter of the center portion 86 is larger than the inner diameter of the entrance 78 and exit 82. In the illustrated embodiment the center portion 86 has one inner diameter. In other embodiments the center portion 86 may have multiple inner diameters to accommodate different sized bricks and/or different flow rates as may be required. Thus the inner diameter of the center portion 86 may be "stair-stepped" such that that inner diameter becomes smaller and smaller or larger and larger at various steps along the center portion 86. A plurality of baffles 90 is coupled to an interior portion of the housing 48, the baffles 90 serving to assist in directing exhaust flow. The plurality of baffles 90 may also be configured to muffle sound. In the illustrated embodiment the housing 48 is one piece, but in other embodiments the housing 48 may be modular and made of multiple pieces to allow the housing 48 to be sized larger or smaller as necessary. In one embodiment the exterior of the housing 48 is substantially cylindrical, but the interior of the housing 48 may have various inner diameters as has been described above. The smaller inner diameters allow for some space between the inner diameter of the housing 48 and an exterior of the housing 48; this space may be used for diesel exhaust fluid injectors, to store diesel exhaust fluid (e.g. urea), to mix diesel exhaust fluid and/or for sound dampening materials.

Figure 4:
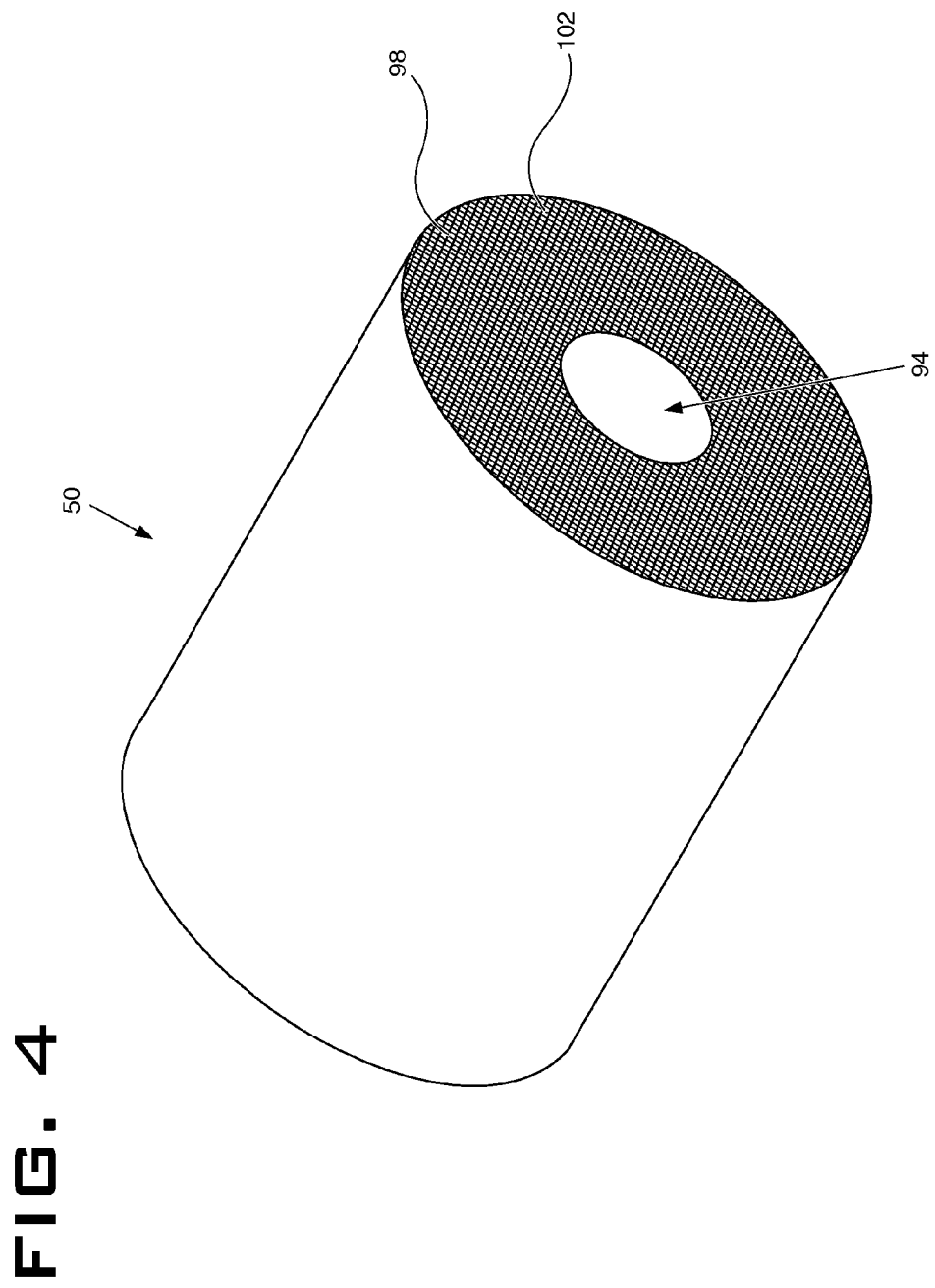
FIG. 4 is a perspective view of a brick.

The first brick 50 is illustrated in FIG. 4. In the illustrated embodiment the second brick 58 and third brick 66 are substantially similar to the first brick 50, but in other embodiments various bricks may be different sized and/or made of different materials. As the first brick 50 is substantially similar to the second and third bricks 58, 66, only the first brick 50 will be described in detail. The first brick 50 is substantially cylindrical in shape, although other shapes are contemplated. An opening 94 is disposed on the first brick 50. In the illustrated embodiment the opening 94 is substantially cylindrical in shape, although other shapes are contemplated. The first brick 50 is made of vanadium. In some embodiments the first brick 50 is made of a ceramic material, iron, chromium, aluminum, titanium oxide, silicon oxide, platinum, palladium, rhodium, cerium, zeolite, cordierite wall flow filter substrate, ceramic fiber filter substrate or some combination of the aforementioned materials. The first brick 50 has a honeycomb structure such that hollow cells 98 are formed between thin walls 102. The honeycomb structure thus allows exhaust gases or other fluids to pass through, while providing some resistance to the flow of the gases or fluids. The level of resistance may be increased or decreased by increasing or decreasing the size of the cells 98 formed in the honeycomb structure. The level or resistance may also be increased or decreased by lengthening or shortening the first brick 50 and/or by increasing or decreasing the size of the opening 94. The first brick 50 has a first flow path A through at least some of the hollow cells 98 of the first brick 50 and a second flow path B through the opening 94. Although a honeycomb structure has been described herein, other embodiments may use similar structures with other internal shapes such as rectangles, circles, polygons, or irregular shapes.

Figure 5:
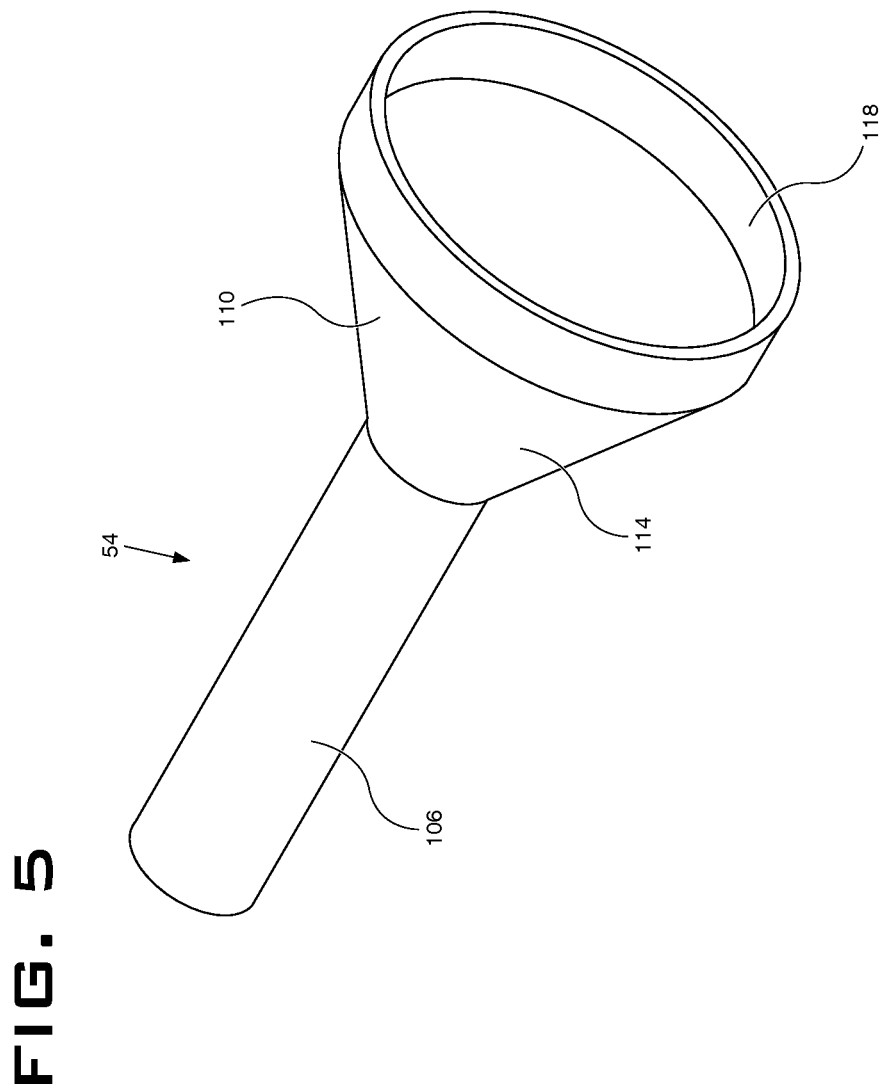
FIG. 5 is a perspective view of a funnel.

The first funnel 54 is illustrated in FIG. 5. In the illustrated embodiment the first funnel 54 is substantially similar to the second funnel 62, but in other embodiments the various funnels may be of different sizes and/or shapes. As the first funnel 54 is substantially similar to the second funnel 62, only the first funnel 54 will be described in detail. The first funnel 54 includes a narrow portion 106 and a wide portion 110. The narrow portion 106 of the funnel is substantially cylindrical and is hollow such that fluid, such as exhaust from the prime mover 14, may pass through the narrow portion 106. The wide portion 110 of the funnel includes a frustoconical portion 114 and a cylindrical portion 118; both are hollow to allow a fluid to pass through. The narrow portion 106 and wide portion 110 are sized and configured to provide a static pressure gain to assist in fluid flow through the exhaust system 18. In the illustrated embodiment the first funnel 54 is made of stainless steel, but in other embodiments the first funnel 54 may be made of a ceramic material, plastic or some other metal.

Figure 6:
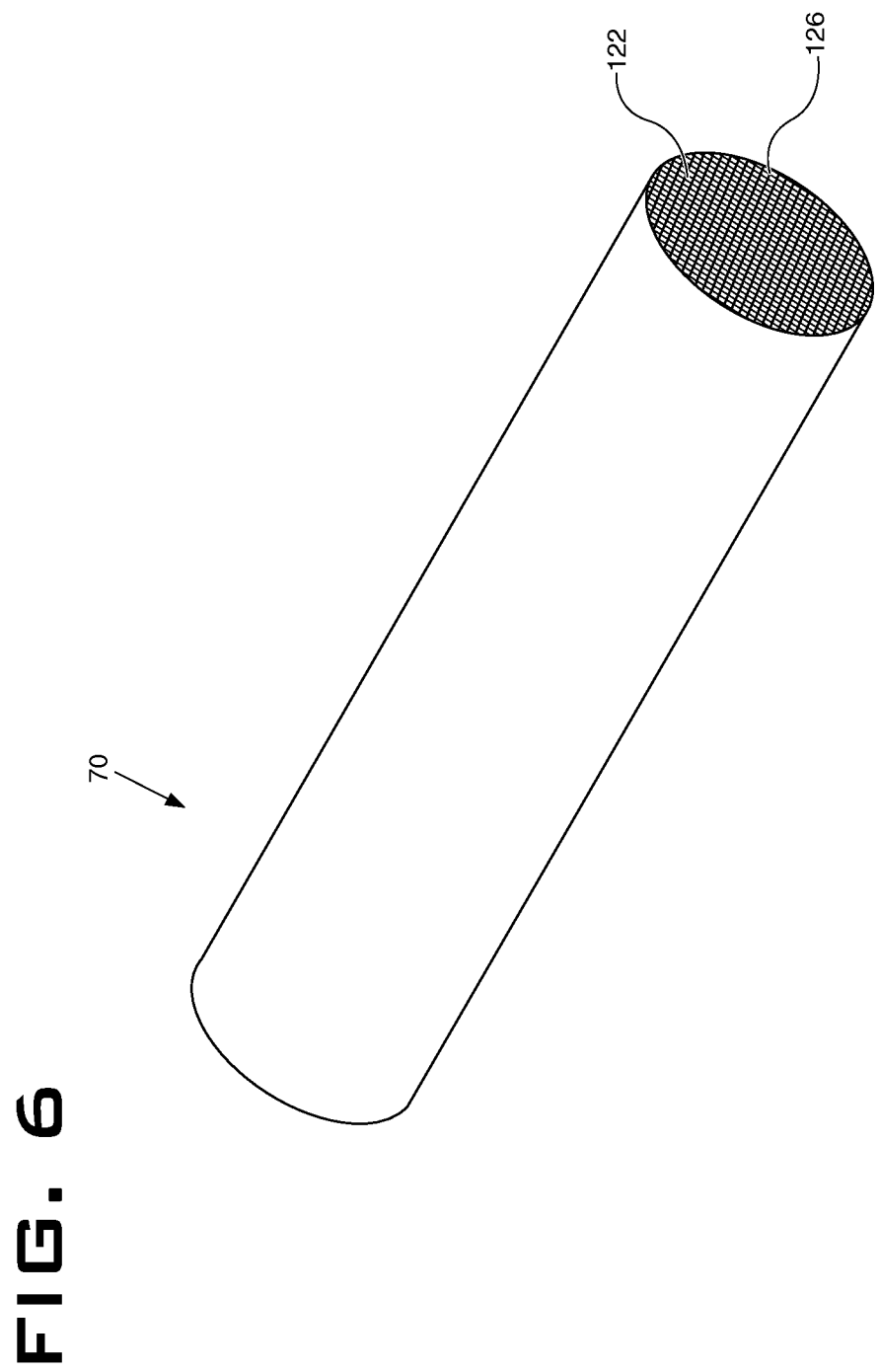
FIG. 6 is a perspective view of an insert.

The first insert 70 is illustrated in FIG. 6. In the illustrated embodiment the second insert 74 is substantially similar to the first insert 70, but in other embodiments various inserts may be different sized and/or made of different materials. As the first insert 70 is substantially similar to the second insert 74, only the first insert 70 will be described in detail. The first insert 70 is sized and shaped to be disposed in the opening 94 of the second brick 58. The first insert 70 is cylindrical although other shapes are contemplated. The first insert 70 is made of vanadium. In some embodiments the first insert 70 is made of a ceramic material, iron, chromium, aluminum, titanium oxide, silicon oxide, platinum, palladium, rhodium, cerium, zeolite, cordierite wall flow filter substrate, ceramic fiber filter substrate or some combination of the aforementioned materials. Other embodiments may use other materials that are useful in the treatment of emissions. The first insert 70 has a honeycomb structure such that hollow cells 122 are formed between thin walls 126. The honeycomb structure thus allows exhaust gases or other fluids to pass through, while providing some resistance to the flow of the gases or fluids. The level of resistance may be increased or decreased by increasing or decreasing the size of the cells 122 formed in the honeycomb structure. The level of resistance may also be increased or decreased by lengthening or shortening the first insert 70.

As can be seen in FIG. 3, the exhaust system 18 is configured as follows. The first brick 50 is placed inside the entrance 78. The narrow portion 106 of the first funnel 54 is positioned in the opening 94 of the first brick 50. The second brick 58 is positioned inside of the cylindrical portion 118 of the first funnel 54. The first insert 70 is placed inside of a narrow portion 130 of the second funnel 62. The narrow portion 130 of the second funnel 62 is placed inside of the opening of the second brick 58. The third brick 66 is placed in a cylindrical portion 118 of the second funnel 62. The second insert 74 is placed inside of the opening of the third brick 66. In an alternative embodiment the inserts are not placed inside the funnel and the narrow portion of the funnel is shorter than the narrow portion of the illustrated embodiment. Thus in the alternative embodiment the first insert 70 is placed inside of the second brick 58 touching an end of the second funnel 62, but not being inside of the second funnel 62. In one embodiment at least one of the second brick 58 and third brick 66 do not have an opening disposed thereon and thus an insert may not be required. In the illustrated embodiment the first, second and third bricks 50, 58, 66, first and second funnels 54, 62, and first and second inserts 70, 74 are coupled to each other and/or the housing using welding and/or supports, but in other embodiments they may be press fit or coupled using an adhesive, a fastener, or the like. Other combinations and arrangements of bricks, funnels and inserts are contemplated but not described herein.

The flow paths of exhaust or some other fluid is illustrated in FIG. 7. The exhaust first enters the first brick 50 where a portion of the exhaust goes to flow path A and a portion goes to flow path B. The portion that goes to flow path A passes through the first brick 50 where the exhaust is treated and/or filtered, then passes into flow path X. The portion that goes to flow path B passes through the first funnel 54 where it is split; a portion goes to flow path C and a portion goes to flow path D. The portion that goes to flow path C passes through the second brick 58 where the exhaust is treated and/or filtered, then passes and is combined into flow path X. The portion that goes to flow path D passes through the first insert 70, where the exhaust is treated and/or filtered, and second funnel 62 where the exhaust is split: a portion goes to flow path E and a portion goes to flow path F. The portion that goes to flow path E passes through the third brick 66 where the exhaust is treated and/or filtered, it then passes and is combined into flow path X. The portion that goes to flow path F passes through the second insert 74 where the exhaust is treated, it then passes and is combined into flow path X. Flow path X passes through the exit 82. Other embodiments have other flow paths such as a flow path that is reversed with respect to the flow path described above. In addition, flow paths may change depending on the configuration of the bricks, funnels and inserts.

INDUSTRIAL APPLICABILITY

The disclosed exhaust system 18 provides an efficient, compact, reliable way to reduce undesirable emissions released into the atmosphere. The disclosed exhaust system 18 may be used to reduce undesirable exhaust emissions from a fossil-fuel powered prime mover in a variety of applications, such as but not limited to, locomotive applications, on-highway trucks or vehicles, off-highway trucks or machines, earth moving equipment, generators, aerospace applications, marine applications, pumps, stationary equipment, or other engine powered applications. Undesirable emissions that may be removed from the exhaust may include particulates, such as carbon and/or soot, and/or chemicals, such as nitrous oxides. In some embodiments a diesel exhaust fluid, such as a urea solution, may be injected into the exhaust stream to assist in the capture and/or removal of undesirable emissions.

It will be apparent to those skilled in the art that various modifications can be made to the disclosed apparatus. Other embodiments will be apparent to those skilled in the art from consideration of the specification and practice of the disclosed apparatus. It is intended that the specification and examples be considered as exemplary only, with a true scope being indicated by the following claims and their equivalents.

What is claimed is:

1. A modular exhaust system comprising:
a first brick having a first opening thereon, the first brick having a first flow path through a first medium and a second flow path through the first opening;
a first funnel having a narrow portion and a wide portion, the narrow portion being at least partially disposed in the first opening and the wide portion being in contact with a second brick;
the second brick having a second opening thereon, the second brick having a third flow path through a second medium and a fourth flow path through the second opening;
a second funnel having a narrow portion and a wide portion, the narrow portion being at least partially disposed in the second opening and the wide portion contacting a third brick; and
the third brick having a third opening thereon, the third brick having a fifth flow path through a third medium and a sixth flow path through the third opening.

2. The modular exhaust system of claim 1 further comprising:
a first insert comprising a fourth medium, the first insert being disposed in the second opening; and
a second insert comprising a fifth medium, the second insert being disposed in the third opening.

3. The modular exhaust system of claim 2 wherein the third and fourth flow paths are comprised of exhaust that has passed through the second flow path.

4. The modular exhaust system of claim 3 wherein the fifth and sixth flow paths are comprised of exhaust that has passed through the fourth flow path.

5. The modular exhaust system of claim 2 wherein a first portion of exhaust passes through the first flow path and does not pass through any of the second, third, fourth, fifth or sixth flow paths, and further wherein a second portion of exhaust passes through the second flow path, the fourth flow path and the sixth flow path.

6. The modular exhaust system of claim 2 wherein at least one of the first brick, second brick, first insert and second insert are made of a cordierite wall flow filter substrate or a ceramic fiber filter substrate.

7. An emissions module for a fossil-fuel powered prime mover comprising:

a housing having an entrance and an exit;

a first brick coupled to the housing, the first brick having a first opening thereon, the first brick having a first flow path through a first medium and a second flow path through the first opening;

a first funnel having a narrow portion and a wide portion, the narrow portion being at least partially disposed in the first opening and the wide portion being in contact with a second brick;

the second brick disposed in the housing, the second brick having a second opening thereon, the second brick having a third flow path through a second medium and a fourth flow path through the second opening;

a second funnel having a narrow portion and a wide portion, the narrow portion being at least partially disposed in the second opening and the wide portion contacting a third brick; and the third brick disposed in the housing, the third brick having a fifth flow path through a third medium.

8. The emissions module of claim 7 further comprising:
a first insert comprising a fourth medium, the first insert being disposed in the second opening.

9. The emissions module of claim 8 further comprising a plurality of baffles coupled to the housing to direct fluid flow inside of the housing.

10. The emissions module of claim 8 wherein a diameter of the entrance of the housing is smaller than the diameter of a center portion of the housing.

11. The emissions module of claim 8 wherein the first brick is coupled to the entrance of the housing.

12. The emissions module of claim 8 wherein the third and fourth flow paths are comprised of exhaust that has passed through the second flow path.

13. The emissions module of claim 12 wherein the fifth and flow path is comprised of exhaust that has passed through the fourth flow path.

14. The emissions module of claim 13 wherein at least one of the first brick, second brick, and first insert are made of a cordierite wall flow filter substrate or a ceramic fiber filter substrate.

15. The emissions module of claim 8 wherein a first portion of exhaust passes through the first flow path and does not pass through any of the second, third, fourth, or fifth flow paths, and further wherein a second portion of exhaust passes through the second flow path, and the fourth flow path.

16. The emissions module of claim 8 wherein the second medium has a resistance to fluid flow that is greater than a resistance to fluid flow of the fourth medium.

* * * * *